(12) United States Patent
Haskin et al.

(10) Patent No.: US 9,650,136 B1
(45) Date of Patent: May 16, 2017

(54) UNMANNED AERIAL VEHICLE PAYLOAD DELIVERY

(71) Applicant: Amazon Technologies, Inc., Seattle, WA (US)

(72) Inventors: Menashe Haskin, Kfar Vitkin (IL); Louis LeRoi LeGrand, III, Seattle, WA (US); Uri Ran, Netanya (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/740,109

(22) Filed: Jun. 15, 2015

(51) Int. Cl.
  *B64C 11/00* (2006.01)
  *B64D 1/12* (2006.01)
  *B64C 39/02* (2006.01)

(52) U.S. Cl.
  CPC .............. *B64D 1/12* (2013.01); *B64C 39/024* (2013.01); *B64C 2201/128* (2013.01); *B64C 2201/141* (2013.01)

(58) Field of Classification Search
  CPC ... B64D 1/00; B64D 1/02; B64D 1/08; B64D 1/12; B64D 9/00; B64C 39/024; B64C 2201/027; B64C 2201/128
  See application file for complete search history.

(56) References Cited

U.S. PATENT DOCUMENTS

| | | | | |
|---|---|---|---|---|
| 5,593,113 A * | 1/1997 | Cox | ......................... | B64D 1/08 177/245 |
| 9,174,733 B1 * | 11/2015 | Burgess | ................... | B64D 1/12 |
| 2010/0001139 A1 * | 1/2010 | Humbert | ................... | B66C 1/34 244/137.4 |
| 2011/0121138 A1 * | 5/2011 | Walsh | ...................... | B64D 1/08 244/149 |
| 2013/0112813 A1 * | 5/2013 | Tardiff | ................... | B64D 17/38 244/137.4 |
| 2014/0097299 A1 * | 4/2014 | Deazley | ................... | B64D 1/08 244/149 |

* cited by examiner

*Primary Examiner* — Richard G Davis
(74) *Attorney, Agent, or Firm* — Kilpatrick Townsend & Stockton LLP (57) ABSTRACT

Techniques for using an unmanned aerial vehicle (UAV) to deliver a payload may be provided. For example, upon arrival to a delivery location, the UAV may release the payload and lower a tether coupling the payload to the UAV. Based on a distance associated with the lowering of the payload, the UAV may release the cable. This release may decouple the payload and at a least a portion of the cable from the UAV, thereby delivering the payload at the delivery location.

20 Claims, 7 Drawing Sheets

UNMANNED AERIAL VEHICLE PAYLOAD DELIVERY

BACKGROUND

More and more users are turning to network-based resources, such as electronic marketplaces, to purchase items (e.g., goods and/or services). A network-based resource may provide a user experience unmatched by a more traditional brick and mortar store. For example, the network-based resource may offer a larger and more diverse selection of items. Further, for some of the items, there may be a number of sellers with different offers. As such, a customer may not only have access to a rich item selection, but may also obtain items at the most convenient offers.

Typically, a user (e.g., a customer) may operate a computing device to access a network-based resource and request information about an item. The network-based resource may provide the information and information about an available delivery method. In turn, the user may purchase the item from the network-based resource and specify a delivery location. The item may be accordingly delivered to the delivery location.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, using an unmanned aerial vehicle (UAV) to deliver a payload, such as one containing an item ordered from a network-based resource. In particular, a UAV may be configured to hold a payload during a flight to a delivery location and to release the payload upon arrival to the delivery location. When released, the payload may be lowered from the UAV by a certain distance. For example, a tether coupling the released payload and the UAV may be deployed at a controlled speed to lower the released payload. The deployment may involve releasing, dropping, unspooling, or extending the tether. Once the distance is travelled, the tether may be in turn released. Releasing the tether may include decoupling a portion of or the entire tether from the UAV. The decoupling may be mechanically and/or electronically controlled and activated. Once the tether is released, the payload and the tether (or the portion thereof) may travel a distance and land on a surface associated with the delivery location. In one example, the travelled distance may not damage or may reduce potential damage to content of the payload. In another example, the travelled distance may minimal. In both examples, the travelled distance may be set based on the content of the payload and/or an expected environment associated with the landing surface. For example, if the content is fragile, the payload may land at the surface prior to releasing the tether. In another example, if an obstacle, a person, and/or a pet are expected to interfere with the delivery, the tether may be released while the payload may still be airborne and out of reach.

To illustrate, consider an example of a network-based resource, such as a web site, associated with an electronic marketplace. A user may access the web site and order cotton napkins and porcelain plates. A UAV may be accordingly deployed to deliver the order from a facility to a location associated with the user. The UAV may hold two packages, one containing the cotton napkins, and one containing the porcelain plates. Upon arrival to the location, the UAV may lower a cable that couples the first package of napkins to the UAV. This cable may be lowered to a certain height from a surface associated with the delivery location. For example, the UAV may unwind the cable completely such that the cable and the first package may free fall from the certain height to land on the surface. In parallel or subsequently, the UAV may lower another cable that couples the remaining package to the UAV. In this case, the package of plates may be lowered all the way to land on the surface. Upon landing, the cable may be severed.

Although the above illustration uses two packages to deliver two items, the embodiments herein are not limited as such. Instead, one package may be used to deliver both items. In this case, a rule may be applied to determine a preferred or recommended height for releasing the cable. For example, the rule may specify that the height should be based on the type and/or amount of packaging, the most fragile item, and/or the combined weights of items. Further, rather than using a single UAV or a single mission to deliver the items, multiple UAVs and/or multiple missions may be used, where each UAV and/or mission may deliver one item at a time.

In the interest of clarity of explanation, the embodiments may be described herein in the context of a UAV delivering a package containing an item ordered from a network-based resource, where the delivery may include lowering the package using a cable. However, the embodiments are not limited as such. Instead, the embodiments may similarly apply to one or more UAVs, each or a collection thereof delivering one/or more payloads. Generally, the delivering may include using one or more tethers, such as one or more cables of the same or of different types, to lower the one or more payloads and releasing the one or more tethers causing the one or more payloads to be delivered. Releasing a tether from a UAV may include severing the tether or decoupling, without severing, the tether from the UAV.

Figure 1:
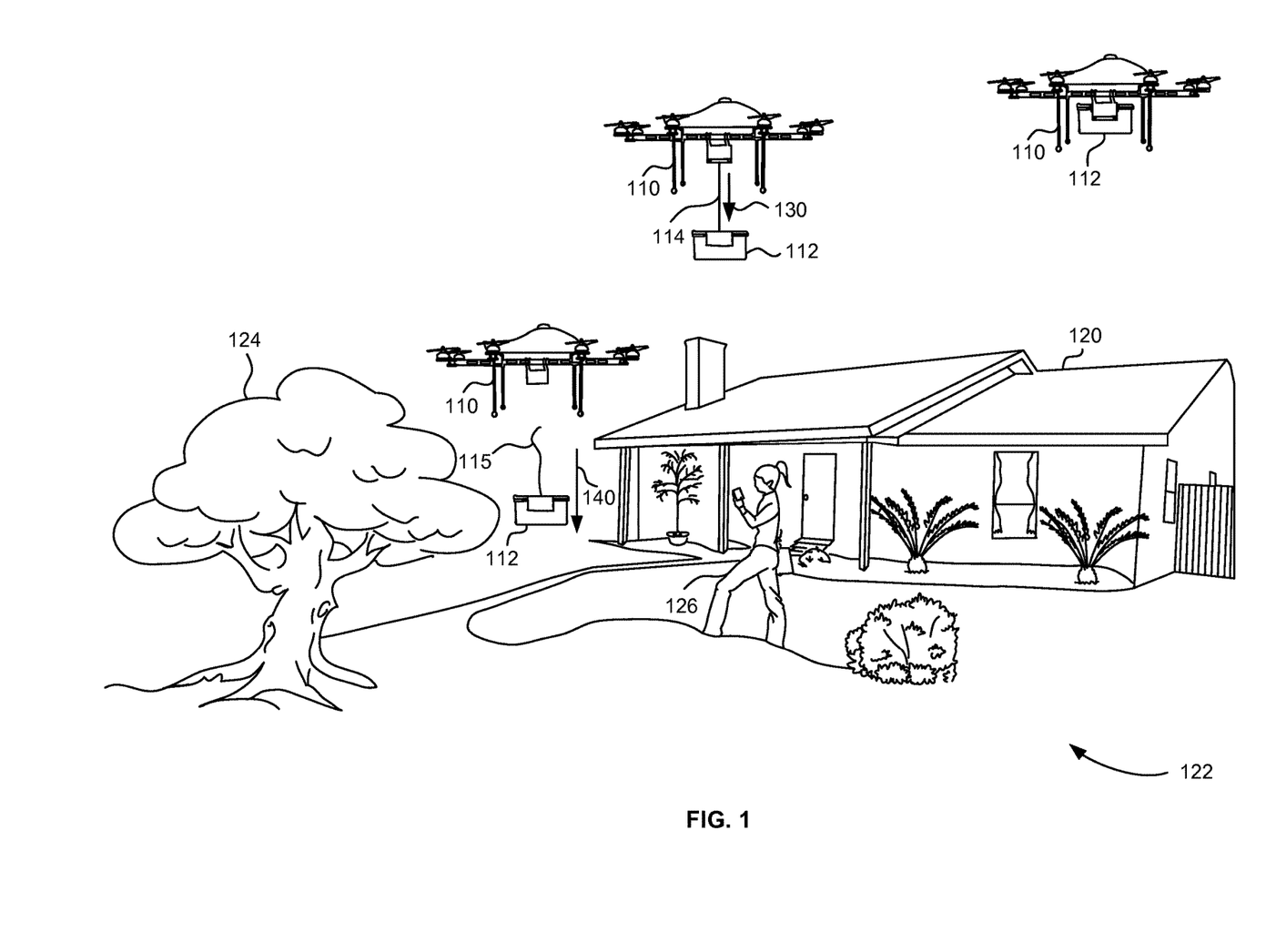
FIG. 1 illustrates an example environment for delivering an item, according to embodiments.

Turning to FIG. 1, an example of an environment for delivering a package is illustrated. In particular, a UAV 110 may be deployed to a location 120 associated with a user to deliver a package 112. In this example environment, the location 120 is shown as a dwelling of the user. However, the embodiments described herein are not limited as such and may similarly apply to other types of locations and/or other associations to the user.

In an example, the user may have operated a computing device to access a network-based resource to order an item. Based on this order, the item may be packaged at a facility and loaded on the UAV 110. The UAV 110 may be remotely controlled or autonomously operated to fly the package 112 from the facility to the location 120, deliver the package 112, and return to the facility or to some other location. These operations of the UAV 110 may represent an example mission that the UAV 110 may be deployed to perform.

Upon arrival to the location 120 (e.g., to the exact location 120 or to a vicinity thereof), the UAV 120 may determine a delivery surface 122 to deliver the package 112. FIG. 1 illustrates the delivery surface 122 as a surface of a backyard of the user's dwelling. However, the embodiments described herein are not limited as such and may similarly apply to other types of surfaces and/or other associations to location 120.

Various techniques may be used to determine the surface 122. In one example technique, data about the surface 122, such as spatial coordinates, may be provided to the UAV 110 (e.g., transmitted thereto and stored thereat) prior to leaving the facility, on the way to the location 120, upon or after arrival to the location 120. In another example technique, this data may be generated based on sensors of the UAV 110. For instance, the UAV 110 may be equipped with a number of sensors, such as imaging, motion, radio frequency, and/or other sensors and one or more processing units to sense and process environmental data associated with the location and generate the data about the surface 122. Of course, a combination of both example techniques may be used.

The data about the surface, whether received from a remote source and/or locally generated by the UAV 110, may include identifiers of, for example, an obstacle 124, an intruder 126, and/or potential thereof when such obstacle and introduce may exist on or in the vicinity of the surface 122. The obstacle 124 may represent an object that may be static, such as a tree, or that may be moving, such as a wind turbine. In comparison, the intruder 126 may represent a living being, such as the user, another user (e.g., a rebellious teenager trying to illegally capture the UAV 110), a pet, a bird, or another living being. Generally, the obstacle 124 and/or the intruder 126 may represent a potential threat to a proper delivery of the package 112 and/or to an improper capturing of the UAV 110. For example, the package 112 or the UAV 110 may get tangled in the obstacle 124. Similarly, the intruder 126 may attempt to bring the UAV 110 down. In an example, the data about the obstacle 124 and/or the intruder 126 may be determined by sensors of the UAV 110. In another example, this data may be received from an external source. This external source may maintain a database of obstacles, intruders, and potential thereof per location, neighborhood, or at some other resolution level, based on historical data associated with past missions.

To mitigate such threat, the UAV 110 may use, in part, a cable 114 to deliver the package 112. The cable 114 may be designed such that upon the cable 114 and/or the package 112 becoming tangled with the obstacle 124 or interfered with (e.g., grabbed) by the intruder 126, the cable 114 may be released (e.g., severed or decoupled without severing) from the UAV 110. The release may free the UAV 110.

In particular, the UAV 110 may use the cable 114 to lower 130 the package 112 by a certain distance. Upon the lowering, the cable 114 may be released such that the package 112 and a portion 116 or all of the cable 114 may be delivered 140 (e.g., may land, arrive, and/or sit) to the surface 122.

The amount of the travelled distance may be preconfigured or controlled. In one example, upon being lowered by the distance, the package 112 may sit or be located at a height from the surface 122. Upon release of the cable 114, the package 112 (along with the portion 116 (or the entire cable 114) may travel the height to arrive to the surface 122. In another example, upon lowering by the distance, the package 112 may land or sit directly on the surface 122 before releasing the cable 114. In this example, the height between the package 112 (e.g., a bottom portion thereof) and the surface 122 may be minimal or non-existent.

The height, or equivalently the travelled distance, may be set based on a number of parameters. The parameters may include one or more of the content of the package 112 (e.g., the ordered item), fragility of the content, the mass of the content, the type of package 112, the amount of protective packaging around the content, and/or the potential of interference in the environment associated with the location 120 (e.g., from the obstacle 124 and/or the intruder 126). These parameters may be used to determine the height such that the likelihood of damage to the package or content thereof may be reduced and/or the likelihood of the interference with the UAV 110 may be reduced. For example, if the content is fragile, the height may be set to be minimal or non-existent. In another example, if a potential threat arising from an approaching intruder 126 is detected, the height may be set such that the cable 114 may be released while the package 112 is airborne and out of reach of the intruder 126.

In both of the last two examples and in other examples, even if interference with the UAV 110, the package 112, and/or the cable 114 occurs, the cable 114 may be released to free the UAV 110. This release may be performed using various techniques. In one example technique, the interference may be detected based on for, instance, an increase in tension on the cable 114. The UAV 110 may then operate a release mechanism to release the cable 114. For example, the release mechanism may cut the cable, weaken the integrity of the cable (e.g., through perforation or other damage) such that the existing tension breaks the cable, and/or causes the UAV 112 to provide sufficient thrust to break the cable. In another example technique, the cable 114 may be configured to self-release based on an increase of the tension. For example, the end of the cable 114 coupling the cable 114 to the UAV 110 may not be tied to the UAV 110. In this example, the tension may be sufficient to pull the entire cable 114, thereby, freeing the entire cable 114 from the UAV 110. In another example, the end of the cable 114 may connect the cable 114 to the UAV 110 through a link. The increase in the tension may be sufficient to break the link, thereby, freeing the entire cable 114 from the UAV 110. In yet another example, the cable 114 may include one or more weakness points (e.g., perforations, thinner width or thickness, weak link). In this example, the weakness point(s) may withstand a tension generated from a mass of the package but not the increase in the tension resulting from the interference.

Hence, by deploying UAVs similar to the UAV 110, packages may be delivered to locations. At the locations, the packages may be lowered and released using cables. If potential threats exist, the UAVs and/or the cables may be configured to mitigate these threats by releasing the cables, thereby freeing the UAVs.

Figure 2:
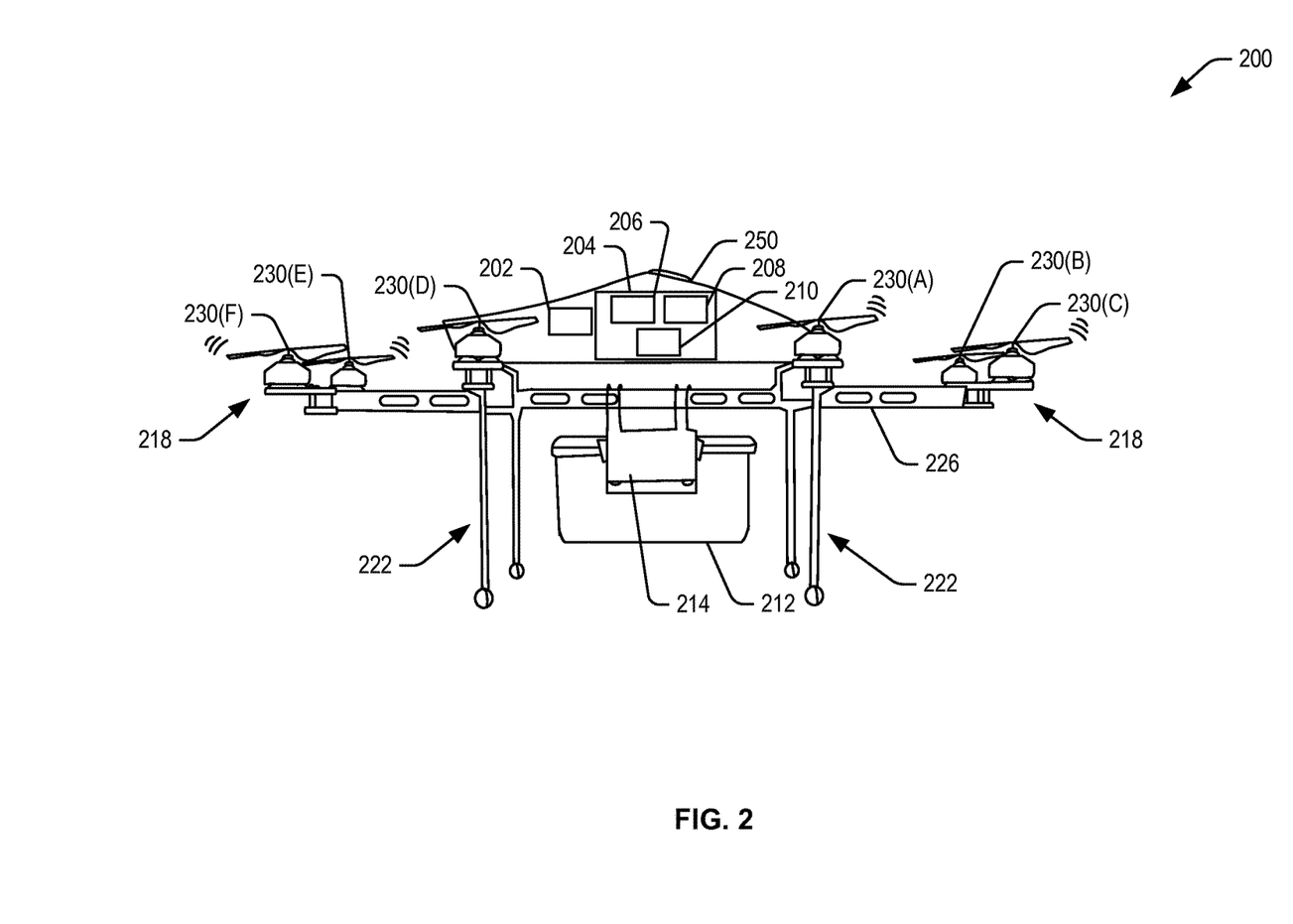
FIG. 2 illustrates an example aerial vehicle configured to deliver an item, according to embodiments.

Example components of a UAV, such as the UAV 110, configured to deliver a package to a location are further illustrated in FIG. 2. This UAV may use a cable, such as the cable 114, as a part of the delivery approach. The cable may be added (e.g., installed, loaded, attached, coupled, connected) to the UAV as a part of deploying the UAV on the delivery mission. Example cable configurations are further illustrated in FIG. 3.

Turning to FIG. 2, an example UAV 200 configured to deliver an item is illustrated. The UAV 200 may be designed in accordance with commercial aviation standards and may include multiple redundancies to ensure reliability. In particular, the UAV 200 may include a plurality of systems or subsystems operating under the control of, or at least partly under the control of, a management component 202. The management component 202 may be configured to mechanically and/or electronically manage and/or control various operations of other components of the UAV 200. For example, the management component 202 may include various sensing, activating, and monitoring mechanisms to manage and control the various operations. For instance, the management component 202 may include or interface with an onboard computing system 204 hosting a management module for autonomously or semi-autonomously controlling and managing various operations of the UAV 200 and, in some examples, for enabling remote control by a pilot. The various operations may also include managing other components of the UAV 200, such as a propulsion system 218 to facilitate flights, a payload holding mechanism 212 to facilitate holding a payload (e.g., a package), and/or a payload releasing mechanism 214 to facilitate release and delivery of the payload. Portions of the management component 202, including mechanical and/or electronic control mechanisms may be housed under the top cover 250 or distributed within other components such as the payload holding mechanism 212 and the payload releasing mechanism 214. In a further example, components remote from the UAV 200 may be deployed and may be in communication with the management component 202 to direct some or all of the operations of the management component 202. These remote components may also be referred to as a management component. In an example, the management component 202 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 200 and detecting objects) (not shown), and radio-frequency identification (RFID) capability (not shown).

The UAV 200 may also include the onboard computing system 204. In an example, the computing system 204 may be integrated with the management component 202. In another example, the computing system 204 may be separate from but may interface with the management component 202. The computing system 204 may be configured to provide an electronic control of various operations of the UAV 200, including the ones provided by the management module. In an example, the computing system 204 may also process sensed data by one or more other components of the UAV, such as the management component 200, to generate data associated with a delivery surface. In a further example, the computing system 204 may also electronically control components of the payload holding mechanism 212 and/or the payload releasing mechanism 214. As illustrated in FIG. 2, the computing system 204 may be housed within the top cover 250 and may include a number of components, such as a computer 206, a storage device 208, and an interface 210. The computer 206 may host the management module configured to provide management operations of the flight and/or other portions of a mission of the UAV 200. For example, the data management module may generate the data associated with the delivery surface, determine a distance by which to lower a payload, a speed of lowering the payload, direct the propulsion system to position the UAV 200 according to this data, activate a release of a package from the payload holding mechanism 212, activate a release of a cable, and/or activate other functions of the mission. The storage device 208 may represent one or more storage media, such as a volatile or non-volatile semiconductor, magnetic, or optical storage media. In an example, the storage device 208 may be configured to store any operational data of the UAV 200, generated or received data associated with the delivery surface, and/or received data associated with a delivery location. The data may include the distance by which the payload may be lowered and the lowering speed. In addition, the storage device 208 may store a set of rules associated with lowering and releasing the payload. This set of rules may specify parameters to determine, where, when, and/or how to deliver the payload such that a likelihood of damaging the payload (or content thereof) and/or interference with the UAV 200 may be reduced. The computer 206 (e.g., the management module) may monitor and/or determine some or all of the parameters and accordingly generate the distance and/or the speed. The interface 210 may represent an interface for exchanging data as part of managing and/or controlling some of the operations of the UAV 210. In an example, the interface 210 may be configured to facilitate data exchanges with the management component 202, other components of the UAV 200, and/or other components remote from the UAV 200. As such, the interface 210 may include high speed interfaces, wired and/or wireless, serial and/or parallel, to enable fast upload and download of data to and from the computing system 204.

As shown in FIG. 2, the UAV 200 may also include the payload holding mechanism 212. The payload holding mechanism 212 may be configured to hold or retain a payload. In some examples, the payload holding mechanism 212 may hold or retain the payload using friction, vacuum suction, opposing arms, magnets, holding, and/or other retaining mechanisms. As illustrated in FIG. 2, the payload holding mechanism 212 may include a compartment configured to contain the payload. In another example, the payload holding mechanism 212 may include two opposing arms configured to apply friction to the payload. The management component 202 may be configured to control at least a portion of the payload holding mechanism 212. For example, the management component 202 may electronically and/or mechanically activate the payload holding mechanism 212 to hold and/or release the payload. In an example, the payload may be released from the payload holding mechanism 212 by opening the compartment, pushing the payload, moving one or both of the opposing arms, and/or stopping an application of friction, vacuum suction, and/or magnetic force.

The UAV 200 may also include the payload releasing mechanism 214. In an example, the payload releasing mechanism 214 may be integrated with the payload holding mechanism 212. In another example, the payload releasing mechanism may be separate from the payload holding mechanism 212. In both examples, the payload releasing mechanism 214 may be configured to lower, using a cable, a payload released from the payload holding mechanism 214 and to release the cable once the payload is lowered by a distance.

As such, the payload releasing mechanism 214 may include a lowering mechanism and a release mechanism. For example, the lowering mechanism may include a cable and/or an electronic or mechanical control configured to lower the cable at a controlled speed. For example, this control may include a winch, a spool, a ratchet, and/or a clamp. The cable may couple the payload with the UAV 200. For example, one end of the cable may be connected, attached, or integral to the payload. Another end of the cable may be coupled to one or more components of the payload releasing mechanism 214, the payload holding mechanism 212, the frame of the UAV 200, and/or other component(s) of the UAV 200. For example, the cable may be coiled around the winch or spool or may be stowed or coiled inside the compartment (if one is used as part of the payload holding mechanism 212). The cable may have a configuration selected based on the mission of the UAV 200, the mass of the payload, and/or an expected environment associated with the delivery location (e.g., the potential interference) as further illustrated in FIG. 3.

In an example, the release mechanism may be integrated with the lowering mechanism. In another example, the release mechanism may be separate from the lowering mechanism. In both examples, the release mechanism may be configured to release the cable when the payload may have been lowered by a certain distance. Releasing the cable may include severing the cable, weakening the cable, and/or decoupling the cable from the UAV 200 (e.g. from the payload releasing mechanism 214) without severing or weakening the cable.

To sever the cable, the release mechanism may include a sharp surface, such as a blade to, for example, cut the cable when applied thereto. To weaken the cable, the release mechanism may include a sharp head, edge, and/or point, such as a hole puncher, or a friction surface to cause a damage to the integrity of the structure of the cable. Other release mechanisms may also be used to sever or weaken the cable. An example may include a mechanism configured to apply a thermoelectric effect to the cable. For instance, a contact surface, such as one using an electrical conductor, may be configured to release heat upon application of a voltage. The contact surface may come in contact with the cable or may be integrated within different sections of the cable. Upon application of the voltage, the contact surface may sever or weaken the cable by applying heat to the cable. To decouple the cable from the UAV 200, the cable may be in the first place insecurely coupled to the UAV 200 such that, upon an unwinding of the cable, the cable may become detached from the UAV 200. For example, the cable may be coiled around the winch or spool without having any of the cable ends attached to the winch or spool or to another component of the UAV 200. In another example, the cable may be coupled to a component of the UAV 200 through a weak link such that upon a tension generated based on the mass of the payload, the link may be broken to free the cable from the UAV 200.

The release mechanism may be electronically or mechanically controlled. This control may be effected based on, for example, the distance by which the payload may have been lowered and/or based on an amount of a tension of the cable, an increase in the amount, a decrease in the amount, or a sudden or fast change in the amount. Various configurations may be used to measure the distance, the amount of tension, and the change in the amount. For example, the distance may be determined from the number of rotations of a winch or spool if one is used or based on a distance or cable length sensor. The amount of the tension and the change in the amount may be determined based on spring-based or electronic-based sensors.

Further, the release mechanism may be electronically activated based on a signal generated in response to detecting that the distance may have been travelled and/or the amount or change in the amount of tension. In another example, the release mechanism may be activated based on a mechanical configuration. For example, as the cable may be lowered, a ratchet may load a spring that may be coupled to release mechanism. Upon the load exceeding a threshold, the spring may be released, thereby activating the release mechanism. In another example, a tension of the cable may be used to hold the release mechanism away from the cable. As soon as the tension changes (e.g., the cable becomes loose indicating that the payload may be resting on the ground), the release mechanism may be activated to sever or weaken the cable.

Further, the UAV 200 may include a propulsion system 218. In some examples, the propulsion system 218 may include rotary blades or otherwise be a propeller-based system. As illustrated in FIG. 2, the propulsion system 218 may include a plurality of propulsion devices, a few of which, 230(A)-230(F), are shown in this view. Each propeller device may include one propeller, a motor, wiring, a balance system, a control mechanism, and other features to enable flight. In some examples, the propulsion system 218 may operate at least partially under the control of the management component 202. In some examples, the propulsion system 218 may be configured to adjust itself without receiving instructions from the management component 202. Thus, the propulsion system 218 may operate semi-autonomously or autonomously.

The UAV 200 may also include landing structure 222. The landing structure 222 may be adequately rigid to support the UAV 200 and the payload. The landing structure 222 may include a plurality of elongated legs which may enable the UAV 200 to land on and take off from a variety of different surfaces. The plurality of systems, subsystems, and structures of the UAV 200 may be connected via frame 226. The frame 226 may be constructed of a rigid material and be capable of receiving via different connections the variety of systems, sub-systems, and structures. For example, the landing structure 222 may be disposed below the frame 226 and, in some examples, may be formed from the same material and/or same piece of material as the frame 226. The propulsion system 218 may be disposed radially around a perimeter of the frame 226 or otherwise distributed around the frame 226. In some examples, the frame 226 may attach or be associated with one or more fixed wings.

Hence, a UAV, similar to the UAV 200, may be deployed on a mission to, for example, deliver a payload, by using in part a tether, such as a cable. The UAV may autonomously or semi-autonomously complete or perform a portion of the mission. For example, coordinates of a delivery location may be provided to the UAV. The UAV may hold the payload in a payload holding mechanism and fly to the delivery location. Upon arrival to the location, the UAV may sense different environmental data to determine a surface for delivering the payload and a distance by which the payload may be lowered. Accordingly the UAV may release the payload from the payload holding mechanism. The UAV may also operate a payload release mechanism to controllably lower the payload using a cable based on the distance and accordingly releasing the cable to deliver the payload along with a portion of or the entire cable to the delivery surface.

Figure 3:
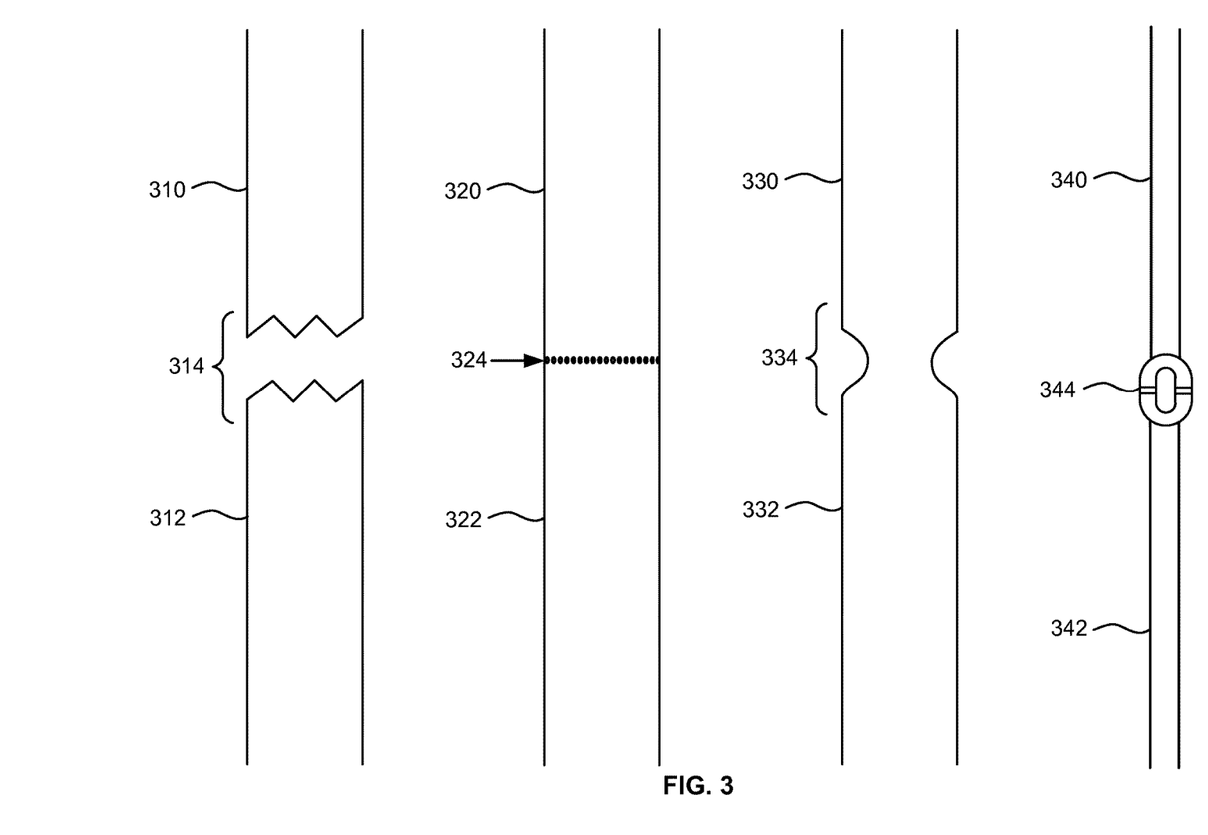
FIG. 3 illustrates example cable configurations usable to deliver an item, according to embodiments.

FIG. 3 illustrates example configurations of the cable that may be used as a part of delivering the payload to the delivery surface. Generally, a particular cable configuration may be selected based on various parameters. The cable configuration may include strength of the cable (e.g., how much tension the cable may sustain), the material of the cable, the thickness and length of the cable, and/or the coupling mechanism of the cable to the UAV. The parameters may include the mission (e.g., the type of the mission, the length of the flight potentially affecting the acceptable weight of the cable), the weight of the payload and content thereof, the type of content (e.g., how fragile), the expected distance by which the cable may be lowered, the expected environment associated with the delivery location or delivery surface (e.g., potential threat from an interfering object or intruder). Some or all of these parameters may be used to select a configuration that may reduce the likelihood of damage to the payload or content thereof and/or the likelihood of the interference. For example, if a payload of two and half kilograms (about 5.5 pounds) is to be delivered, a cable capable of sustaining a tension of twenty-five newton (about 5.6 pounds of force) with a small margin (e.g., one percent) may be used. In another example, a cable capable of sustaining a tension from lowering the payload at a controlled speed and self-breakable once the lowering is stopped may be used. For instance and referring to the two and half kilogram payload, the margin may be negative (e.g., minus eight percent). As such, a cable capable of sustaining a tension of twenty-three newton (about 5.2 pounds of force) may be used.

In an example, the cable may be made of different materials, such as a plastic material (e.g., nylon), paper, metal, and/or other environmentally friendly materials. One end of the cable may be connected, attached, or coupled to the payload. In an example, this end may be securely attached or may even be part (e.g., integrated with) of the payload. The other end of the cable may be coupled to one or more points or components of the UAV. For example, this end may be securely attached to a component of the UAV, connected to a hook of the UAV, attached to a weak link of the UAV, or coiled without a secure connection around a winch or spool of the UAV.

The selection of the cable configuration may be performed prior to the start of the mission. In other words, the UAV may be deployed on the mission carrying a cable of the particular configuration. However, during the execution of the mission, such as a part of releasing the cable, the cable configuration may be changed. For example, the cable may be severed or weakened as further described herein next. A combination of the illustrated cable configurations may also be selected.

As illustrated in FIG. 3, an example cable configuration may include a cable that may be severed in two or more portions during the mission execution. One portion 310 may remain coupled to the UAV. In comparison, the other portion 312 may be decoupled from the UAV, while remaining coupled to the payload. The severing may be effected around a surface 314 of the cable.

Another example configuration may include a cable that may be weakened prior or during the mission execution. For instance, the cable may be weakened by introducing damage thereto, such as by perforating the cable to insert holes 324. This may result in two portions of the cable. One portion 320 may be attached to the UAV, while the other portion 322 may be attached to the payload. The damage (e.g., the holes 324) may be repeated at various intervals such that a pattern of damage may occur at equal or various distances from each other. In a particular case, the cable may include more than two portions. In an example, a cable of this configuration may be loaded to the UAV prior to deployment. In another example, the damage may be introduced by a release mechanism of the UAV as the cable may be lowered. Regardless, the damage may result in the separations of portions 320 and 322 (and potentially other portions), which in turn may free the payload and the portion 322 from the UAV.

Another example configuration may involve a cable that may include various thicknesses or widths. This variety may be created prior to or during the mission execution. For example, a first portion 330 of the cable may be of one thickness and/or width, an adjacent portion 334 may be of a different (e.g., a smaller) thickness and/or width, followed by another portion 332 of a same or similar thickness and/or width as the first portion 330. The adjacent portion 334 may represent a weakness point (e.g., by having a smaller thickness and/or width). This pattern of varying the thickness and/or width may be repeated at various intervals. As illustrated, the first portion 330 may be coupled to the UAV, while the other portion 332 may be coupled to the payload. When the tension on the cable from the mass of the payload reaches the weakness point (e.g., the portion 334 being rolled out from a spool), the tension may cause the portions 330 and 332 to separate around the portion 334, thereby freeing the payload and the portion 332 from the UAV.

Yet another example configuration may involve a cable and a link 344. This configuration may be available as part of deploying the UAV. The link 344 may represent a connection capable of sustaining a tension smaller than the one applied to the cable based on the mass of the payload. As such, when the tension is applied to the link (e.g., to a portion of the cable including the link 344 based on that portion being rolled out from a spool), the connection may be broken. In an example, the link 344 may connect two portions 340 and 342 of the cable. In turn, the portions 340 and 342 may be coupled to the UAV and the payload, respectively. As such, when the link 344 is broken, the portion 342 may be decoupled from the UAV, thereby freeing the payload and the portion 342 from the UAV. In another example, rather than coupling two portions of the cable, the link 344 may couple the entire cable to the UAV. In this case, when the link is broken, the entire cable is decoupled from the UAV.

Figure 4:
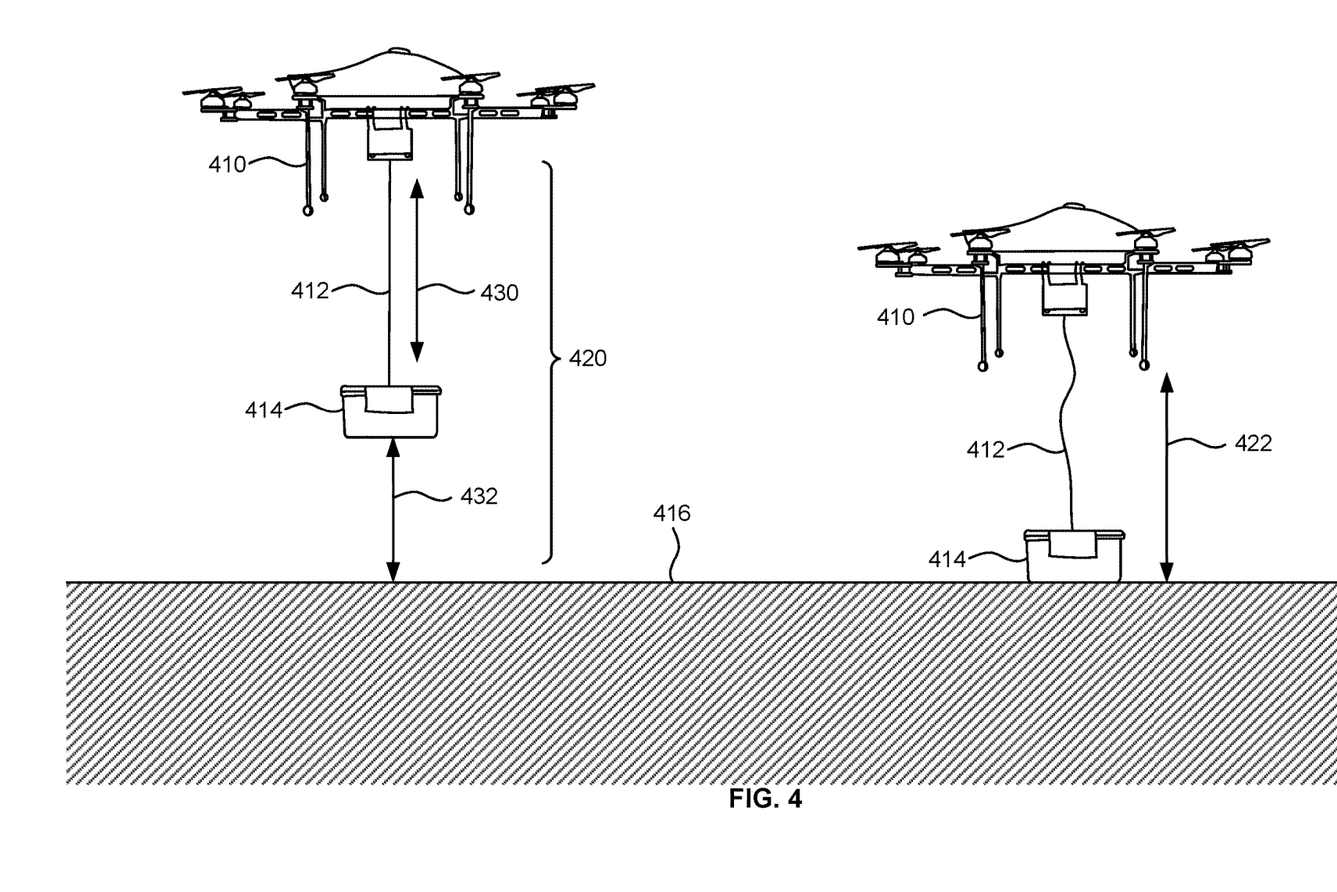
FIG. 4 illustrates example approaches for delivering an item, according to embodiments.

Any or a combination of the above cable configurations may facilitate the release of the cable, thereby freeing the payload and a portion or all of the cable the UAV. Further, any or a combination of these configurations may facilitate the usage of various release mechanisms and/or UAV maneuvers to release the cable. FIG. 4 illustrates example maneuvers and respective applicable release mechanisms.

In particular, a UAV 410, similar to the UAV 200 of FIG. 2, may lower a cable 410 to deliver a package 414 to a delivery surface 416 from a certain height 432 (as illustrated on the left-hand side of FIG. 4) or may lower the package 414 to sit directly on the delivery surface 416 (as illustrated on the right-hand side of FIG. 4). Referring to the left-hand side illustration, the UAV 410 may be positioned at an altitude 420 (e.g., at a total height from the delivery surface 416). The UAV may lower the package 414 by deploying the cable 412 by a distance 430 that may not exceed the altitude 420, such that when the package 414 travels the distance 430, the package 414 may be at the height 432 away from the delivery surface 416. The traveled distance 430 may correspond to the length of the deployed cable 412. The height 432 may be set based on one or more parameters to reduce a likelihood of damage to the package 414 or content thereof and/or a likelihood of interference with the UAV 410, the cable 412, and/or the package 414.

Various techniques may be used to determine the altitude 420, the distance 430, and/or the height 432. For example, the altitude 420, distance 430, and/or height 432 may be predefined (e.g., received from an external source) prior to deploying the UAV 410 or during a flight of the UAV to a location associated with the delivery surface. In another example, upon arriving at the location, the UAV 410 may sense and process various environmental data to generate the altitude 420, distance 430, and/or height 432.

In an example, as the cable 412 is being deployed (e.g., uncoiled from a spool), the UAV 410 (e.g., a control component thereof) may monitor the deployed distance (e.g., the length of the cable) to determine whether the cable 412 may have traveled the distance 430 and/or the package may be positioned at the height 432. Various electronic and mechanical techniques may be used to monitor this traveled distance relative to the distance 430. For example, imaging and/or depth sensors may be used. In another example, the traveled distance may be derived from the number of rotations of a deploying spool or from the remaining length of the un-deployed cabled. In yet another example, the cable 412 may include a trigger mechanism (e.g., a protruding component such as a connector) attached to a location of the cable. This location may correspond to the desired deployment length. In this case, when the package 414 travels the distance 430, the trigger mechanism may indicate that the distance 430 may have been reached and may activate a component of a release mechanism of the UAV 410 (e.g., releasing a spring that may in turn apply a sharp edge to the cable 412).

In another example, no monitoring of a traveled distance may be needed. In this example, the altitude 420 may be larger than the length of the cable 412. The cable 412 may be coupled but not securely attached to the UAV 410 (e.g., coiled around a spool without having any connected end). As such, deploying the cable 412 on its own may free the cable 412 and the package 414 from the UAV 410.

Regardless of whether a traveled distance may be monitored or not, various cable configurations, as the ones illustrated in FIG. 3, may be used. In particular, once the package 414 travels the distance 430, the release mechanism of the UAV 410 may be activated thereby releasing the cable 412 (or portion thereof) to decouple the package 414 from the UAV 410. Various techniques may be used to activate the release mechanism. In an example of an electronically-based technique, an electronic control component of the UAV 410 may generate a signal to activate the release mechanism (e.g., an electronically controlled portion thereof). This may include severing the cable 412, weakening the cable 412, or performing a UAV maneuver to create a thrust force on the cable 412 that may cause the severing or the weakening thereof. In an example of a mechanically based technique, a spring may be released to, in turn, activate the release mechanism. In this example, the spring may become loaded based on the tension in the cable or based on the traveled distance. When the load exceeds a threshold, the spring may be released. In this example, the spring may alternatively be already loaded and may be released by a trigger component of the cable (e.g., a connector attached thereto). In yet another example of a mechanically based technique, the release mechanism may include unwinding the entire cable 412.

Turning to the right-hand side of FIG. 4, another example maneuver for decoupling the package 414 from the UAV 410 is illustrated. In this example, the UAV 410 may be positioned at an altitude 422 (e.g., at a total height from the delivery surface 416) that may not exceed the length of the cable 412. In other words, when the cable 412 is lowered, the package 414 may come in contact with the delivery surface 416 (e.g., arrives, lands, or sits) before the cable 412 may have been released. As such, the tension in the cable 412 may be reduced once the package 414 contacts the delivery surface and before the release of the cable 412. This reduction in tension may be used to activate the release mechanism of the UAV 410.

In particular, and similarly to the left-hand side illustration, the release mechanism may be electronically or mechanically activated. In an example of an electronic activation, imaging sensors, depth sensors, and/or tension sensors may be used to determine that the package 414 may be in contact with the delivery surface and accordingly release the above described activation signal. In an example of a mechanical activation, the tension of the cable may be used to hold the release mechanism away from the cable. As soon as the tension may be reduced, the release mechanism may be activated to sever, weaken, or completely unwind the cable.

A maneuver that may combine portions or all of the above techniques may also be used. For example, the UAV 410 may first lower the cable 412 such that the package 414 may come in contact with the delivery surface 416 to initiate the release of the cable 412. Subsequently and before completing the release, the UAV 410 may move the package 414 to the height 432 (e.g., by changing the altitude or by winding the cable 412) and continue the release of the cable 412. This maneuver may be used, for example, in case when a potential threat (e.g., one from an intruder) may have been detected after the package 414 may have come in contact with the delivery surface 416. The converse approach may also be used when the potential threat disappears or is deemed to be a false alarm. In this case, the maneuver may start with the release initiated at the height 432 and continue with the release completed while the package 412 may have come in contact with the delivery surface 416.

Figure 5:
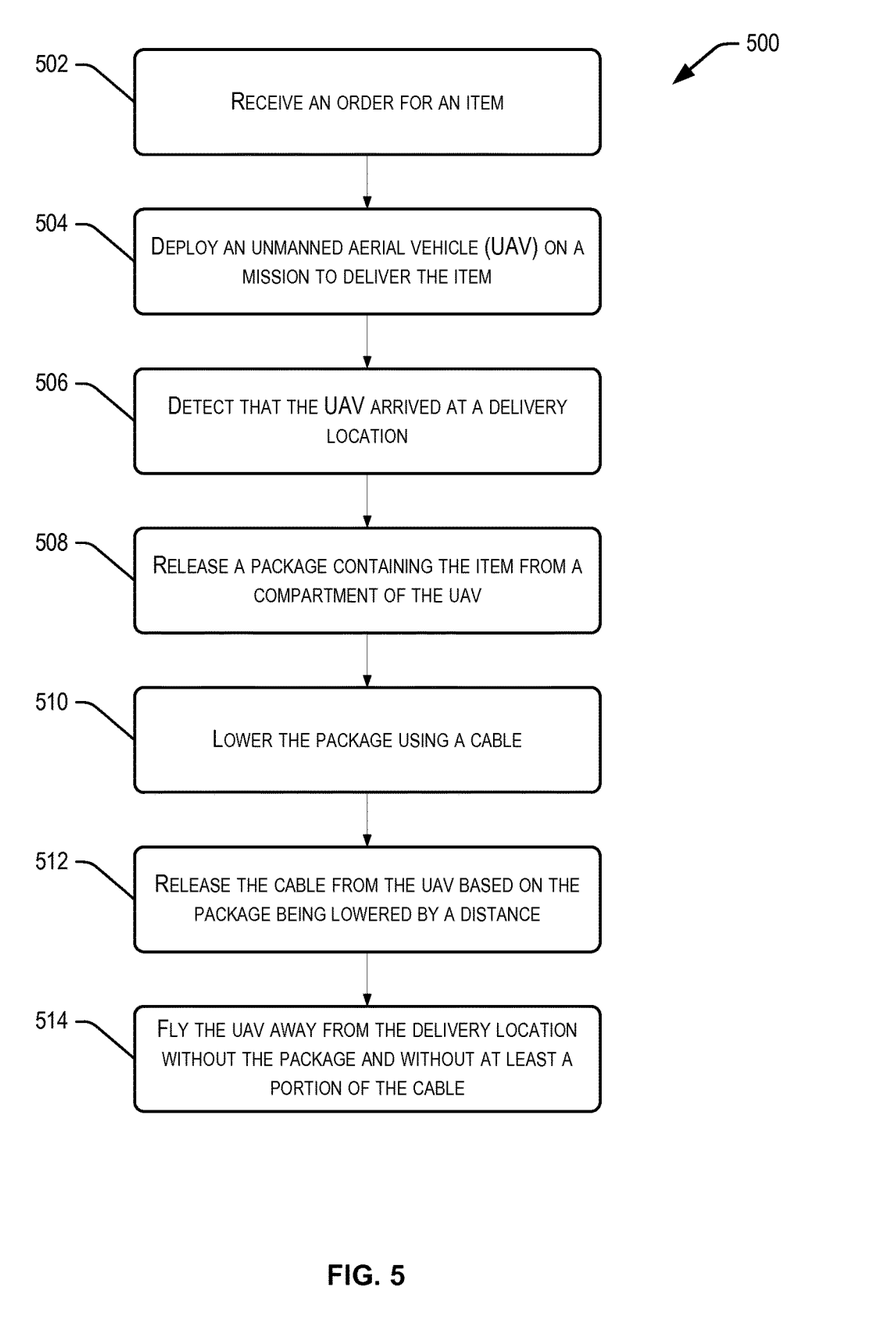
FIG. 5 illustrates an example flow for delivering an item, according to embodiments.

Turning to FIG. 5, the figure illustrates an example flow 500 for delivering a package. In the illustrative operations, some of the operations or functions may be embodied in, and fully or partially automated by, a management component (e.g., the management component 202 of FIG. 2). Nevertheless, other or a combination of other electronic and/or mechanical components may be additionally or alternatively used. Also, while the operations are illustrated in a particular order, it should be understood that no particular order is necessary and that one or more operations may be omitted, skipped, and/or reordered.

The example flow 500 of FIG. 5 may start at operation 502, where an order for an item may be received. For example, the order may be received at a network-based resource associated with an electronic marketplace. The electronic marketplace may offer the item. The order may be received from a computing device of a user accessing the network-based resource. The received order may be processed to generate a mission. The mission may specify a delivery location and/or a delivery surface associated with the user and, as applicable, data associated with an expected environment at the delivery location and/or delivery surface. The mission may be provided to a UAV to cause a deployment thereof. For instance, data about the mission may be transmitted to a management component of the UAV. In addition, the item may be packaged and the resulting package with a cable of a selected cable configuration may be loaded on the UAV.

At operation 504, the UAV may be deployed on the mission to deliver the item. The UAV may autonomously or semi-autonomously execute the mission or portions thereof including, for example, flying to the delivery location, delivering the package including the item, and returning to a home base. In an autonomous execution, the management component of the UAV may manage and control the execution of the portions of the mission. In a semi-autonomous execution, the management component may do so in coordination or under the instructions of another management component. This other component may be a ground component in remote communication with the UAV's management component.

At operation 506, the UAV may have been detected to have arrived to the delivery location. This detection may be based on determining current location data of the UAV (e.g., GPS coordinates) and based on comparing this location data to that of the delivery location. Arriving to the delivery location may include arriving at the exact delivery location or to a vicinity of the delivery location. Once at the delivery location, the UAV may sense, as applicable, various environmental data to determine or update the delivery surface and/or how to release the package (e.g., what maneuver to follow, the altitude to sit at, the distance by which to lower the package, and other data).

At operation 508, the package may be released from the UAV. For example, the UAV may have been holding the package by operating a payload holding mechanism, such as by retaining the package in a compartment. Upon determining the delivery surface and positioning at a proper altitude, the payload holding mechanism may be further operated to release the package from the payload holding mechanism (e.g., the compartment may be opened, thereby dropping the package).

At operation 510, the package may be lowered using a cable. The cable may be a part of a payload releasing mechanism of the UAV. The payload releasing mechanism may be operated to lower the cable at a controlled speed by the distance, such that the package may be dropped to a certain height or come in contact with the delivery surface.

At operation 512, the cable may be released from the UAV based on the package being lowered by the distance. For example, upon travelling the distance, a release mechanism of the payload release mechanism may be electronically or mechanically activated, managed, and/or controlled. The release mechanism may sever the cable, weaken the cable, or decouple the cable from the UAV without severing or weakening the cable. Once the cable is released, a portion of the cable or the entire cable and the package may be completely decoupled from the UAV, and thereby delivered to the delivery surface.

At operation 514, the UAV may fly away from the delivery location with the package and without the portion or the entire cable. For example, the UAV may complete remaining portions of the mission by returning to the home base or to some other location.

Figure 6:
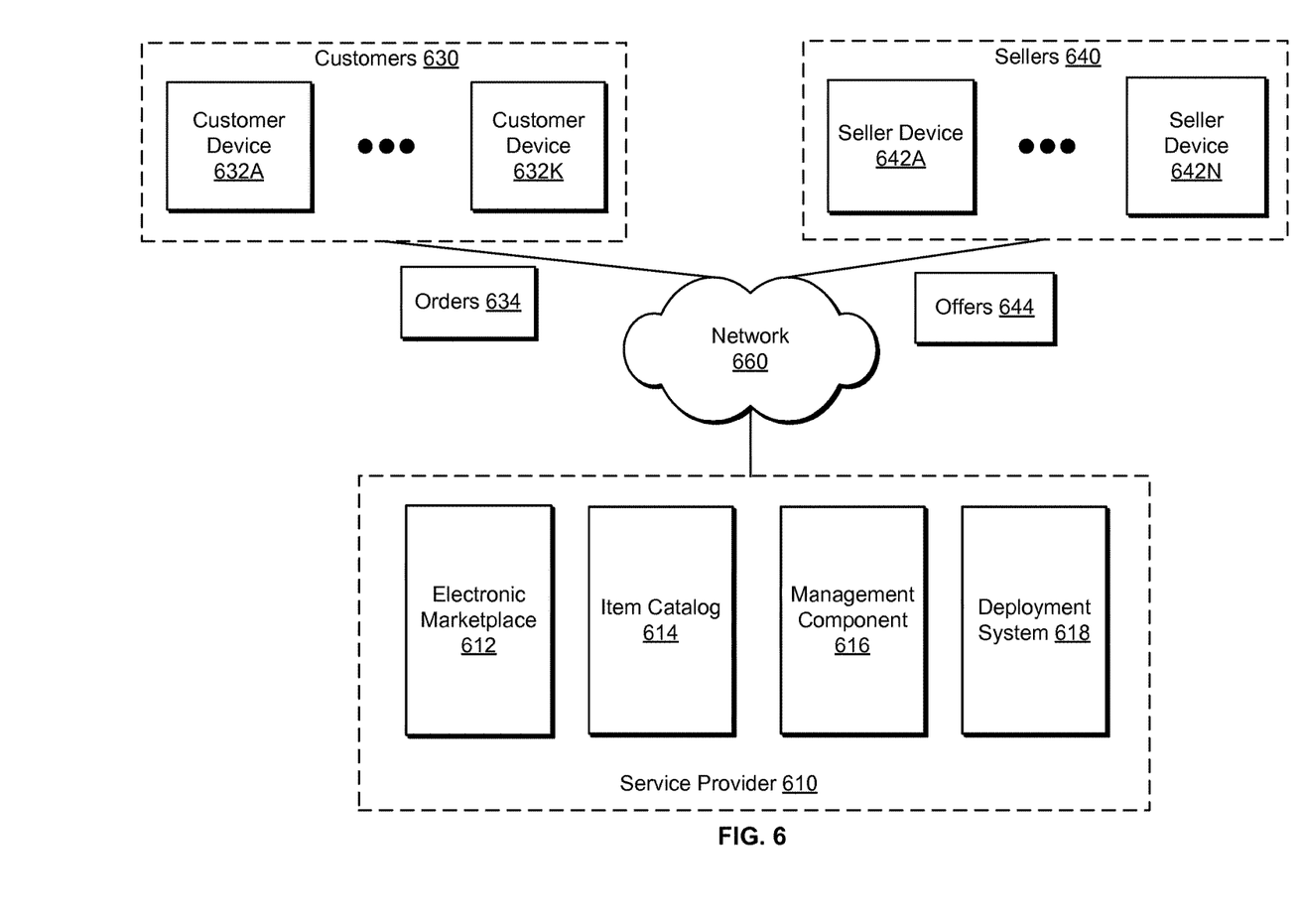
FIG. 6 illustrates an example environment for offering an item, according to embodiments.

Hence, by deploying the UAV, an item may be delivered to a location associated with the user. The item may be ordered from an electronic marketplace. A deployment system associated with the electronic marketplace may be configured to deploy the UAV. FIG. 6 illustrates example architecture for providing an electronic marketplace. Further, the UAV may autonomously or semi-autonomously be operated to complete the delivery. Based on expected or detected environmental conditions around the location, the UAV may perform different maneuvers and deploy a releasable cable to safely deliver the item while reducing a likelihood of interference with the UAV.

Turning to FIG. 6, a computing environment for implementing some of the above-described features within the context of an electronic marketplace is illustrated. In particular, a service provider 610 of an electronic marketplace 612 may implement a management component 616 and a deployment system 618, in part or in full, on a service provider computing resource.

The management component 616 may be configured to provide data before deployment or after deployment to a plurality UAVs to support, direct, manage, and/or control operations of some or all of these UAVs. Data provided to a UAV may include coordinate locations of a delivery location and/or delivery surface, expected environmental conditions at the location and/or surface, a flight path, a delivery time, rules for lowering and releasing a cable and a package, and other data to facilitate the delivery of the package.

The deployment system 618 may be configured to deploy the UAVs, track the respective operations, and provide status information. This may include selecting and configuring different UAVs for different missions based on the missions and/or the availability and capabilities of the UAVs. In a way, the deployment system 618 may manage a fleet of the UAVs and balance the associated operations. Further, the deployment system 618 may interface with and/or integrate with the management component 616 to support, direct, manage, and/or control operations of the UAVs related to deliveries of packages.

The electronic marketplace 612 may offer different items. In an example, a network-based resource, such as a web site, may be configured to facilitate access to the electronic marketplace 612. The network-based resource may, for example, provide access to information about offered items and facilitate orders for these items. The network-based resource and/or other components of an electronic platform may maintain information about the items, the respective offers, conducted transactions, and/or other operations of the electronic marketplace 612. For example, the offered items may be cataloged in an item catalog 614. The item catalog 614 may represent a data structure maintaining the information about the items.

A network-based document (e.g., a web page, a detail page, etc.) of the electronic marketplace 612 may be associated with an item. The network-based document may use information from the item catalog 614. In an example, the network-based document may allow sellers 640 and/or the service provider 610 to define offers of items. For instance, the sellers 640 may list offers 644. The provided information may be added to the item catalog 614. The network-based document may also allow customers 630 to review the information available from the item catalog 614 (e.g., offers of the item) and make an order or purchase decision. The customers 630 may, for example, review the information and place orders 634 for the item.

As such, the service provider 610 may operate the electronic marketplace 612 to facilitate interactions between the service provider 610, the customers 630, and the sellers 640 over a network 660. Each one of the sellers 640 may operate one or more seller devices 642A-N to access the electronic marketplace 612 and perform various seller-related functions. A customer may be an item recipient, a buyer, or any user reviewing, browsing, ordering, obtaining, purchasing, or returning an item of a seller. Each one of the customers 630 may operate one or more customer devices 632A-K to access the electronic marketplace 612 and perform various customer-related functions. Once an order of an item may be received from a customer, the management component 616 and the deployment system 618 may be used to deploy and manage, in part or in full, a UAV to deliver the item to a location associated with the customer.

Figure 7:
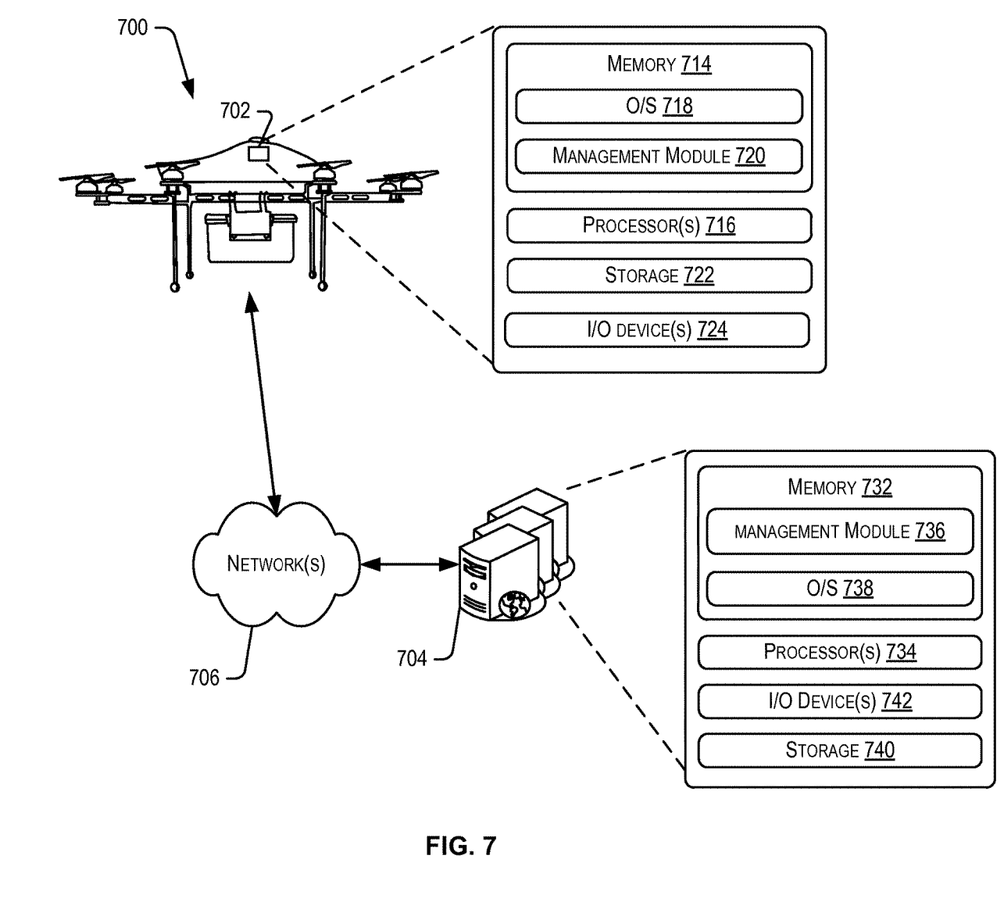
FIG. 7 illustrates an example computing architecture for delivering an item, according to embodiments.

Turning next to FIG. 7, an example computing architecture configured to facilitate a delivery of an ordered item is illustrated. The architecture may include a UAV 700, a server 704, and a network 706. Generally, the architecture may be implemented as part of an electronic marketplace offering items. For example, the server 704 may be in communication with the drone 700 to facilitate a delivery of an item ordered from the electronic marketplace. This communication may occur over the network 706. The network 706 may include any one or a combination of many different types of networks, such as wireless networks, cable networks, cellular networks, radio networks, the Internet, and other private and/or public networks.

Turning now to the details of the server 704, the server 704 may include one or more service provider computers, such as servers and other suitable computing devices, configured to offer various data services to users. The server 704 may be configured to host a web site (or combination of web sites) accessible to customers. The web site may be accessible via a web browser and may enable a customer to place an order for an item.

In embodiments, the server 704 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the server 704 may include one or more servers, perhaps arranged in a cluster, or as individual servers not associated with one another.

In one illustrative configuration, the server 704 may include at least one memory 732 and one or more processing units (or processor(s)) 734. The processor(s) 734 may be implemented as appropriate in hardware, computer-executable instructions, software, firmware, or combinations thereof. Computer-executable instruction, software, or firmware implementations of the processor(s) 734 may include computer-executable or machine-executable instructions written in any suitable programming language to perform the various functions described. The memory 732 may include more than one memory and may be distributed throughout a plurality of a network of servers. The memory 732 may store program instructions (e.g., management module 736) that are loadable and executable on the processor(s) 734, as well as data generated during the execution of these programs. Depending on the configuration and type of memory, the memory 732 may be volatile (such as random access memory (RAM)) and/or non-volatile (such as read-only memory (ROM), flash memory, or other memory).

The server 704 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 732 may include multiple different types of memory, such as static random access memory (SRAM), dynamic random access memory (DRAM), or ROM.

Turning to the contents of the memory 732 in more detail, the memory 732 may include an operating system 738 and one or more application programs, modules or services for implementing the features disclosed herein including at least a management module 736. The management module 736, in some examples, may support, direct, manage, and/or control operations of some or all of the components of the UAV 700. For instance, the management module 736 may transmit data associated with a delivery of an item to the UAV 700. Such data may be used by the UAV 700, such as by a management module thereat, to deliver the item. Furthermore, the management module 736 may be used to select and deploy the UAV 700 on a delivery mission. As part of this selection, the management module 736 may also select a cable configuration that may be used in the delivery of the item. The cable configuration selection may be based on a number of parameters as described herein above. Further, the management module 736 may receive data from the UAV 700 during the deployment and/or execution of the delivery mission. The management module 736 may process that data and provide, as applicable, further instructions to the UAV 700 to adjust the delivery of the item.

In some examples, the server 704 may also include additional storage 740, which may include removable storage and/or non-removable storage. The additional storage 740 may include, but is not limited to, magnetic storage, optical disks, and/or tape storage. The disk drives and their associated computer-readable media may provide non-volatile storage of computer-readable instructions, data structures, program modules, and other data for the computing devices.

The memory 732 and the additional storage 740, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors). The modules of the server 704 may include one or more components. The server 704 may also include I/O device(s) and/or ports 742, such as for enabling connection with a keyboard, a mouse, a pen, a voice input device, a touch input device, a display, speakers, a printer, or other I/O device.

Turning now to the details of the UAV 700, the UAV 700 may include some or all of the components of the UAV 200 described in connection with FIG. 2. In an illustrative embodiment, the UAV 700 may include a management component implemented, in part or in full, by computing system 702 similar to the computing system 204 of FIG. 2. The computing system 702 may include at least one memory 714 and one or more processing units (or processor(s)) 716. The processor(s) 716 may be implemented as appropriate in hardware, computer-executable instructions, software, firmware, or combinations thereof. Computer-executable instruction, software, or firmware implementations of the processor(s) 716 may include computer-executable or machine-executable instructions written in any suitable programming language to perform the various functions described. The memory 714 may include more than one memory and may be distributed throughout the computing system 702. The memory 714 may store program instructions (e.g., a management module 720) that are loadable and executable on the processor(s) 716, as well as data generated during the execution of these programs. Depending on the configuration and type of memory, the memory 714 may be volatile (such as random access memory (RAM)) and/or non-volatile (such as read-only memory (ROM), flash memory, or other memory).

The computing system 702 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 714 may include multiple different types of memory, such as static random access memory (SRAM), dynamic random access memory (DRAM), or ROM.

In some examples, the computing system 702 may also include additional storage 722, which may include removable storage and/or non-removable storage. The additional storage 722 may include, but is not limited to, magnetic storage, optical disks, and/or tape storage. The disk drives and their associated computer-readable media may provide non-volatile storage of computer-readable instructions, data structures, program modules, and other data for the computing devices.

The memory 714 and the additional storage 722, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. The modules of the computing system 702 may include one or more components.

Turning to the contents of the memory 714 in more detail, the memory 714 may include an operating system 718 and one or more application programs, modules or services for implementing the features disclosed herein including at least a management module 720. The management module 720 may be configured to provide flight operation management functions and/or to manage operations of different components to deliver an item at a delivery location. In an example, the management module 720 may operate autonomously or independently of the management module 736 of the server 704. In another example, the management module 720 may operate semi-autonomously or be fully controlled by the management module 736.

The computing system 702 may also include I/O device(s) 726 (e.g., interfaces, ports) such as for enabling connection with the server 704. The I/O device(s) 726 may also enable communication with the other components and systems of the UAV 700 (e.g., a propulsion system, and a payload holding system, a payload releasing system).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system associated with using an unmanned aerial vehicle (UAV) to deliver a package associated with an electronic marketplace, the system comprising:
   a frame;
   a severing mechanism associated with the frame and comprising an electrical conductor contact surface;
   a cable associated with the frame; and a computing system associated with the UAV and comprising one or more processors and one or more memories, wherein the one or more memories store computer-readable instructions that upon execution by the one or more processors configure the computing system to instruct the UAV to:
  fly to a location associated with the delivery of the package, the package including an item ordered from the electronic marketplace;
  release the package from a compartment of the UAV based at least in part on detecting that the UAV has arrived to the location;
  lower the package at a controlled speed based at least in part on extending the cable from the UAV, the cable coupling the package to the UAV;
  operate, based at least in part on detecting that the package has been lowered by a distance, the severing mechanism of the UAV to sever the cable, the cable severed based at least in part on a thermoelectric effect applied to the cable, severing the cable causing the delivery of the package and of at least a portion of the cable; and
  fly away from the location without the package and the at least a portion of the cable based at least in part on the severing of the cable.

2. The system of claim 1, wherein the distance indicates a height between the package and a surface associated with the delivery, wherein the height reduces a potential of damage to the item based at least in part on the delivery.

3. The system of claim 1, wherein the distance indicates that the package sits at a surface associated with the delivery.

4. The system of claim 1, wherein the severing mechanism comprises further a blade, wherein operating the severing mechanism further comprises mechanically activating the severing mechanism to apply the blade to the cable causing the severing of the cable.

5. A system associated with using an unmanned aerial vehicle (UAV) to deliver a payload, comprising:
  one or more processors; and
  one or more memories, wherein the one or more memories store computer-readable instructions that upon execution by the one or more processors configure the system to instruct the UAV to:
    lower the payload with a tether from the UAV based at least in part on detecting that the UAV has arrived to a location associated with a mission of the UAV, the tether coupling the payload to the UAV and comprising perforations;
    release, based at least in part on detecting that the payload has been lowered by a distance, at least a portion of the tether from the UAV, the portion of the tether released based at least in part on contact between the perforations of the tether and a head, edge, or surface within the UAV, releasing the at least a portion of the tether causing a delivery of the payload and of the at least a portion of the tether; and
    fly away from the location without the payload and the at least a portion of the tether based at least in part on the releasing of the at least a portion of the tether.

6. The system of claim 5, wherein the payload comprises an item, wherein the mission comprises the delivery of the payload based at least in part on an order of the item from an electronic marketplace, wherein the tether comprises a cable, and wherein the cable is selected based at least in part on one or more of: the mission, content of the payload, weight of the payload, or an expected environment associated with the location.

7. The system of claim 5, wherein the distance indicates that the payload is at a height from a surface associated with the delivery, and wherein the computer-readable instructions further configure the system to determine that the height is acceptable for releasing the at least a portion of the tether based at least in part on one or more of: content of the payload or an expected environment associated with the location.

8. The system of claim 5, wherein releasing the at least a portion of the tether comprises decoupling the tether from the UAV.

9. The system of claim 5, wherein releasing the tether comprises severing the tether based at least in part on separating portions of the tether along the perforations.

10. The system of claim 9, wherein severing the tether comprises reducing an integrity of a structure of the tether based at least in part on lowering the payload, and wherein the tether is severed based at least in part on a mass of the payload and on the reduced integrity of the structure.

11. The system of claim 9, wherein severing the tether comprises cutting the tether based at least in part on applying a friction surface within the UAV.

12. The system of claim 5, wherein the tether is lowered at a controlled speed based at least in part on applying friction to at least one of: the tether or a spool configured to roll the tether.

13. An unmanned aerial vehicle (UAV) configured to deliver a payload, the UAV comprising:
  a frame;
  a cable associated with the frame and comprising a weakness point that is defined based at least in part on a mass of the payload;
  a computing system comprising one or more processors and one or more memories, wherein the one or more memories store computer-readable instructions that upon execution by the one or more processors configure the UAV to:
    hold the payload during a portion of a flight associated with a delivery of the payload; and
    deliver the payload by at least:
      lowering the payload by using the cable; and
      releasing at least a portion of the cable at or around the weakness point based at least in part on lowering the payload by a distance, the releasing causing the delivery of the payload and of the at least a portion of the cable.

14. The UAV of claim 13, wherein the computer-readable instructions further configure the computing system to manage the flight of the UAV.

15. The UAV of claim 13, wherein the weakness point of the cable is configured to sustain a tension associated with lowering the payload and is further configured to break based at least in part on the lowering being stopped.

16. The UAV of claim 13, wherein releasing the cable further comprises severing the cable based at least in part on applying a thermoelectric effect to the cable.

17. The UAV of claim 13, wherein releasing the cable further comprises severing the cable based at least in part on a reduction of a tension of the cable indicative of the payload reaching a surface associated with the delivery.

18. The UAV of claim 13, wherein the weakness point comprises perforations, and wherein releasing comprises separating the cable at one or more of the perforations as the cable is being lowered or once as the payload is lowered by the distance.

19. The UAV of claim 13, wherein an end of the cable is integrated with the payload, wherein the weakness point comprises a link, wherein the link connects an other end of the cable to an other component of the UAV, wherein the cable has a sufficient strength to lower the payload, wherein the link lacks the sufficient strength, and wherein the releasing at least a portion of the cable comprises releasing the cable based at least in part on breaking the link based at least in part on a mass of the payload.

20. The UAV of claim 13, wherein releasing at least a portion of the cable comprises severing the cable at the weakness point based at least in part on operating a propulsion system of the UAV to provide a thrust sufficient to cause the severing.

\* \* \* \* \*